United States Patent
Muthukrishnan et al.

(10) Patent No.: US 12,020,232 B2
(45) Date of Patent: Jun. 25, 2024

(54) BIO-MESH NETWORK LEVERAGING NATURAL SELECTION OPTIMIZATION FOR INTELLIGENT AUTO-HEALING

(71) Applicant: Bank of America Corporation, Charlotte, NC (US)

(72) Inventors: Ramaswamy Muthukrishnan, Tamil Nadu (IN); Palamakula Satyanarayana Reddy, Telangana (IN); Sreekanth Raghuveer Maringanti, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 206 days.

(21) Appl. No.: 17/669,493

(22) Filed: Feb. 11, 2022

(65) Prior Publication Data

US 2023/0259917 A1 Aug. 17, 2023

(51) Int. Cl.
*G06Q 20/26* (2012.01)
*G06N 20/00* (2019.01)
*G06Q 20/40* (2012.01)
*H04W 84/18* (2009.01)

(52) U.S. Cl.
CPC ............. *G06Q 20/26* (2013.01); *G06N 20/00* (2019.01); *G06Q 20/401* (2013.01); *H04W 84/18* (2013.01)

(58) Field of Classification Search
CPC .................................................. G06Q 20/401
See application file for complete search history.

(56) References Cited

U.S. PATENT DOCUMENTS

| | | | | |
|---|---|---|---|---|
| 10,692,057 | B1* | 6/2020 | Daruwalla | G06Q 20/28 |
| 2007/0043784 | A1* | 2/2007 | Parkinson | G06F 16/21 |
| 2007/0239577 | A1* | 10/2007 | Grody | G06Q 40/04 |
| | | | | 705/35 |
| 2016/0086177 | A1* | 3/2016 | Billings | G06Q 40/12 |
| | | | | 705/40 |
| 2020/0090261 | A1* | 3/2020 | Tumulty, II | G06Q 20/42 |

* cited by examiner

*Primary Examiner* — Viet D Vu
(74) *Attorney, Agent, or Firm* — Weiss & Arons LLP

(57) ABSTRACT

Apparatus and methods for accelerating the remediation of broken transactions using parallel machine learning processing and optimization is provided. The methods may include a network access point receiving, from an application programming interface, a broken transaction. The methods may also include a network access point selecting a bionic element within a bio-mesh network for processing the broken transaction and routing the broken transaction to the bionic element. The bio-mesh network may include a plurality of bionic elements. The methods may further include the bionic element receiving the broken transaction and extracting, from the broken transaction, a set of features, transmitting the set of features to a policy bank, and, in response to the policy bank failing to identify a stored routine associated with the set of features for fixing the broken transaction, running in parallel two machine-learning algorithms to identify an optimal routine for fixing the broken transaction.

10 Claims, 5 Drawing Sheets

BIO-MESH NETWORK LEVERAGING NATURAL SELECTION OPTIMIZATION FOR INTELLIGENT AUTO-HEALING

FIELD OF TECHNOLOGY

Aspects of the disclosure relate to fixing broken transactions. In particular, aspects of the disclosure relate to leveraging natural selection optimization to fix broken transactions in a muti-tier network.

BACKGROUND

The successful capture of a trade within a trading system should result in the trade details being sent to the back office immediately, via an interface, for operational processing. If any trade details are not fed to a downstream System of Records, an operations team needs to investigate the broken transaction and determine how to fix the breaks or flow. However, manual identification and investigation of cross trading platform broken transactions cannot provide near real time remediation. The resultant time lag in fixing the broken transaction can result in numerous reconciliation difficulties, such as business escalation, reputational risk and SLA miss for reconciliation.

It would be desirable, therefore, to provide systems and methods for auto healing a broken transaction in real time, to avoid missing reconciliation deadlines and to enhance performance and customer relations.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
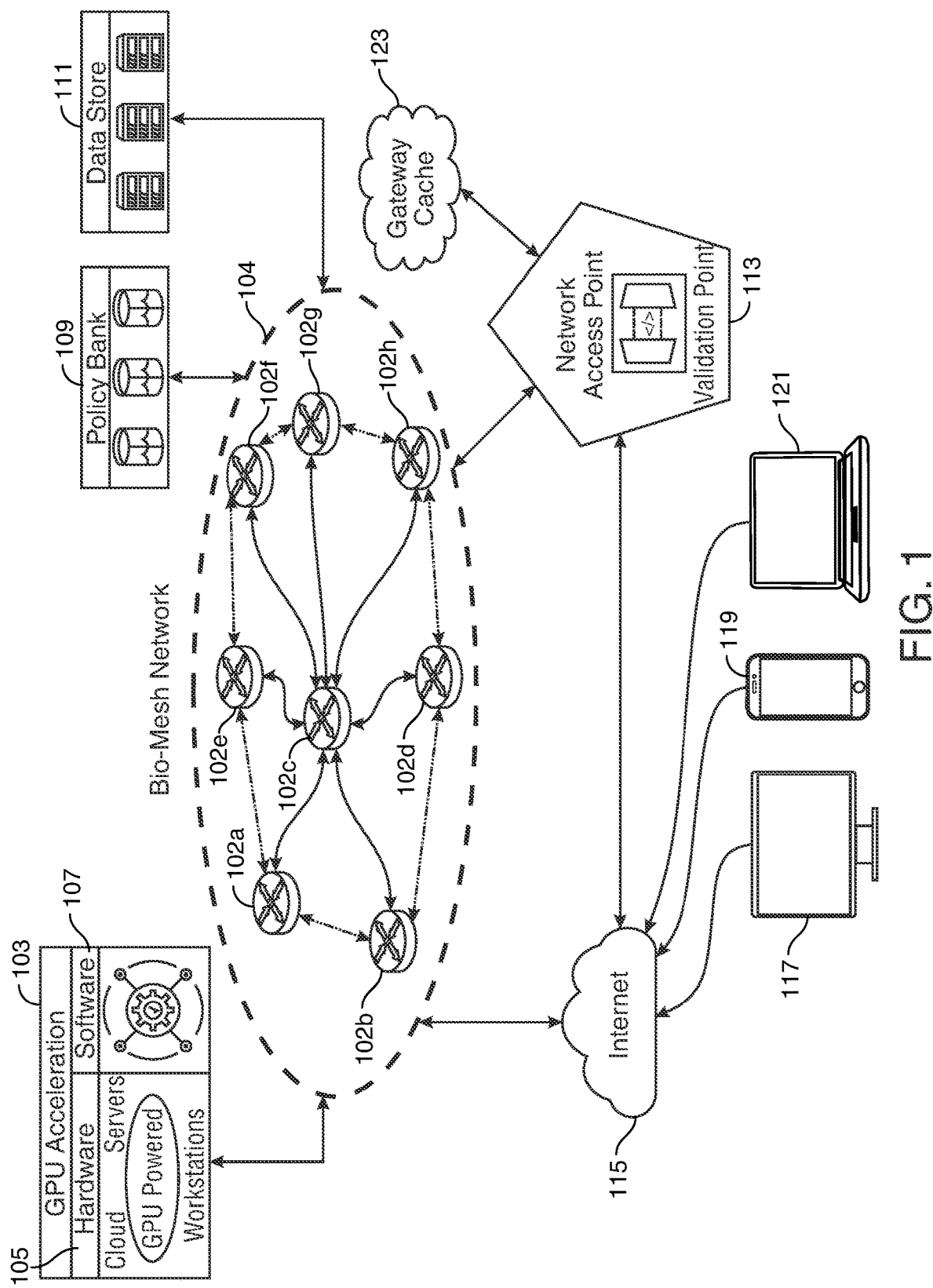
FIG. 1 shows illustrative apparatus and methods in accordance with the invention.

Apparatus and methods for accelerating the remediation of broken transactions using parallel machine learning processing and optimization are provided. The methods may include method steps performed by one or more of a network access point, an application programming interface ("API"), a gateway cache, a bionic element, a policy bank and/or a data store as described herein.

For the purposes of the application, a transaction may be a financial transaction characterized by one or more electronic entries into a bank, brokerage house, stock trading platform, or any other suitable location. As a transaction is electronically processed by a processing entity such as a bank, or a clearing house, an entry may be created in a header of the transaction. Exemplary information input into a header of a transaction each time the transaction is processed may include a business identifier identifying the business that is processing the transaction, the processing that has been applied to the transaction, a debit and corresponding credit, a key created by the processing entity, a timestamp, and any other suitable data.

For each transaction, there may be systems in place that must be adhered to which, if not followed, characterize a transaction as 'broken.' For example, for every debit executed by a processing entity when processing the transaction, there must be a stored, corresponding credit, and vice versa. As such, if a transaction includes an entry that is missing a counter entry—e.g. because the entry is carrying a different amount, a different description of posted entry, or the entry is not available—this transaction may then be classified as a broken transaction. Other examples of a broken transaction may include a transaction that went through a processing step but the associated data is missing in the header, a transaction having an entry with an incorrect value date—i.e., an incorrect timestamp, such as when there is a mismatch between a timestamp appended to the sender of the transaction and a timestamp appended to a receiver of the transaction, whether or not a process executed on the transaction has an associated stored key, etc.

The methods may include the network access point receiving, from an application programming interface ("API"), a broken transaction. It is to be understood that the network access point may receive broken transactions from two or more APIs.

The methods may include the network access point selecting a bionic element within a bio-mesh network for processing the broken transaction. The network access point may route the broken transaction to the selected bionic element.

The bio-mesh network may include a plurality of bionic elements. Each bionic element have similar or different processing capabilities. The network access point may maintain a queuing table used to determine which bionic element should accept a broken transaction. In some embodiments, a gateway cache may maintain the queuing table.

In some embodiments, the methods may include a gateway cache storing a log recording the routing of broken transactions from the network access point to the plurality of bionic elements. The methods may also include the gateway cache maintaining a prioritization algorithm used by the network access point to determine which bionic element in the plurality of bionic elements should receive an incoming broken transaction. In exemplary embodiments, the gateway cache may store data detailing, for each bionic element, a quantity of transactions that each bionic element can handle. The prioritization algorithm may be used to prioritize a first bionic element over a second bionic element based, for example, on processing speed, a strength of a network connection, past performance, or any other suitable factors.

The methods may include the bionic element receiving the broken transaction. The methods may include the bionic element extracting from the broken transaction a set of features. The set of features may be stored in a header of the broken transaction. The set of features may include one or more of an account time stamp, a transaction type, a transaction amount, a transaction time stamp, an origin account and a destination account.

The methods may include the bionic element transmitting the set of features to a policy bank. When bionic element determines that the policy bank stores data corresponding to the set of features and additionally stores a routine for fixing a transaction having the set of features, the bionic element may transmit the routine to the policy application pipeline for implementing the routine.

In response to the policy bank failing to identify a stored routine associated with the set of features for fixing the broken transaction, the methods may include the bionic element identifying, from a header of the broken transaction, each instance of the transaction being processed by a processing entity. The methods may also include the bionic element assigning to each instance, in chronological order, a step number, to represent the transaction as a sum of $n_x$ steps from x=0 to x=n. The methods may also include the bionic element associating with each $n_x$ step information stored in the header for that $n_x$ step. The conversion of the transaction into a set of consecutive numerical steps with associated data may enable the machine learning algorithms discussed below to process the transaction data.

The methods may include the bionic element, for each step, comparing information stored in the header associated with the step to compliance protocols. Exemplary compliance protocols may include a match between a debit entry and a corresponding credit entry, a correct value date and each step being step associated with a key.

In some embodiments, the methods may include the bionic element identifying, based on information stored in the header, one or more errors in a subset of the n steps. Each error may include one or more of a mismatch between a debit entry and a corresponding credit entry, an incorrect value date and/or a failure to be associated with a key. The errors may be a failure of the data associated with the step to conform to the compliance protocols.

The methods may include the bionic element identifying a subset of the steps that fail to satisfy one or more of the compliance protocols. The methods may include the bionic element feeding the sequence of steps, the subset of the steps, and, for each step in the subset, information detailing the one or more failures to meet the compliance protocols, to both a firefly algorithm ("FI") and a genetic algorithm ("GA"). Alternately, the methods may include the bionic element feeding the sequence of steps, the subset of the steps, and, for each step in the subset, the errors identified, to both the firefly algorithm ("FI") and the genetic algorithm ("GA").

The methods may include the bionic element running the FI and GA, in parallel. The methods may include the bionic element receiving from the FI and GA outputs including, for each step in the subset, one or more solutions. The methods may include the bionic element using an optimization algorithm set to optimize speed only, selecting from the outputs of the FI and GA, for each step, a first optimized solution. The optimization algorithm may use derivatives or may not using derivatives. The optimization algorithm may use first and/or second derivatives of an objective function, or any other suitable optimization algorithm. Exemplary optimization algorithms may include an adaptive learning rate model, a gradient descent method, a stochastic gradient descent, or any other suitable optimization algorithm. The methods may include the bionic element combining each first optimized solution, of each step, to create a first policy. The methods may include the bionic element transmitting the first policy to a policy application pipeline.

The methods may include the policy application pipeline implementing the first policy to the broken transaction to convert the broken transaction to a first fixed transaction and transmitting the first fixed transaction to the network access point. The policy application pipeline may first look for any specific protocols or business logics associated with the API that sent out the broken transaction. These specific protocols or business logics may first be applied to the transaction. Once these are accounted for, the first policy may be applied to the broken transaction. Exemplary business logics may include each entry in the transaction storing the value data in decimals and not in a cents/dollar format. An exemplary policy for fixing a broken transaction may include re-routing the transaction to one of the processing entities to re-process the transaction at that step where there was a failure, and then passing the transaction through the remaining steps because the failure at the processing entity cascaded to the remaining entities that processed the transaction. The re-processing may include an instruction to the processing entity to include a counter-entry of a debit/credit that was mistakenly omitted previously.

The methods may include the network access point transmitting the first fixed transaction to the API. The methods may include the network access point, prior to transmitting the first fixed transaction to the API, searching a log file stored in a gateway cache to retrieve a communication protocol associated with the API.

The methods may include the network access point, in response to the transmission, receiving a response from the API indicating that the first fixed transaction has been rejected. The API may reject the first fixed transaction based on one or more user-specific rules stored in the API. The API may be referred to alternately herein as a 'user.' For example, the API may be run by a brokerage house, a hedge fund, a bank, a line of business within a bank, or any other suitable user. The API may store, or access stored, user-specific rules listing features that a transaction must have for the transaction to be accepted by the user. A 'fixed' transaction that does not satisfy the user-specific rules may be rejected by the user and a message indicating the rejection may be transmitted by the API back to the network access point.

In some embodiments, the API may transmit back to the network access point a binary response—such as 'fixed' or 'not fixed', 'acceptable' or 'not acceptable', etc., to indicate whether or not the transaction has been accepted by the user's system. Thus, the response received by the network access point from the API may not detail what aspects of the transaction were rejected. In these embodiments, the bionic element must, on its own, figure out a new policy to fix the transaction without any feedback from the user's system that rejected the first fixed transaction.

The methods may include the network access point transmitting a command to the bionic element to output a second policy to fix the broken transaction. In response to receipt of the command, the methods may include the bionic element adjusting the optimization algorithm to optimize both speed and accuracy. The methods may include the bionic element, using the adjusted optimization algorithm, to select from the previously-output outputs of the FI and GA, a second optimized solution for each step included in the subset. The methods may include the bionic element combining each second optimized solution to create a second policy. The methods may include the bionic element transmitting the second policy to the policy application pipeline.

The methods may include the policy application pipeline implementing the second policy to the broken transaction to convert the broken transaction to a second fixed transaction and transmit the second fixed transaction to the network access point.

The methods may include the network access point performing the method steps of transmitting the second fixed transaction to the API. The methods may include the network access point, in response to the transmission, receiving a response from the API indicating that the second fixed transaction has been accepted. The response may be a binary response as described above.

The methods may include the network access point, in response to the receipt of the response from the API indicating that the second fixed transaction has been accepted, transmitting an instruction to the bionic element to upload to the policy bank the set of features and the second policy.

The methods may include the bionic element, in response to receipt of the instruction, uploading to the policy bank the set of features and the second policy. The uploading, by the bionic element, of the set of features and the second policy may augment the policy bank's data store to include the newly-developed second policy that successfully fixed the broken transaction having the set of features.

The methods may include the network access point, in response to the transmission, receiving a response from the API indicating that the second fixed transaction has been rejected. In response, the network access point may transmit an instruction to the bionic element to fix the broken transaction again. In response, the bionic element may adjust the optimization algorithm to optimize accuracy more than was optimized when creating the second policy, and to optimize speed less than was optimized when creating the second policy. The optimization algorithm may then be used to create a third policy using the method steps described above with respect to the second policy. As such, it follows that as a broken transaction is rejected one, two, three, four, or more times by an API, the bionic element may, each time, incrementally increase the prioritization of optimizing the accuracy of the solution and incrementally decrease the prioritization of optimizing the speed at which the solution is output. After the rejection of a broken transaction more than a threshold number of times by an API, the broken transaction may be transmitted to a queue for being manually solved.

Methods performed by the bionic element may be performed by some or all of the bionic elements in the bio-mesh network. As such, each bionic element in the bio-mesh network may receive broken transactions and execute the methods described herein to fix the broken transactions. Specifically, prior to processing a broken transaction using artificial intelligence and machine learning, each bionic element may first check the policy bank to see if a broken transaction having the set of features of the current broken transaction was previously fixed. If such a policy has already been created, the bionic element may implement the previously-generated policy, thus avoiding the need to process the transaction using the artificial intelligence ("AI") methods of the parallel processing of the GA and FI algorithms. It follows that the collective intelligence provided by the bio-mesh system provides that a solution generated by one bionic element is subsequently available, via the policy bank, to all bionic elements to use. This may allow for the quick fixing of broken transactions using the stored policy data and frees up the computational resources of all the bionic elements to process only broken transactions that have not yet been fixed by a different bionic element in the bio-mesh network.

In some embodiments, when the bionic element is a first bionic element and the broken transaction is a first broken transaction, the methods may include the gateway cache maintaining a log of each transaction being processed by bionic elements in the bio-mesh network. The methods may include each bionic element in the bio-mesh network transmitting data to the gateway after receiving a broken transaction for processing, the data including the transaction and/or the set of features. When a transaction has been fixed, the network access point may notify the gateway cache to delete information relating to the transaction from the log.

The bionic element may be a first bionic element, and the broken transaction may be a first broken transaction. In some of these embodiments, the methods may include the first bionic element searching the gateway cache to determine if a second bionic element included in the bio-mesh network is currently processing a second broken transaction having features similar to features of the first broken transaction. The first bionic element may execute these steps after receiving a communication from the policy bank that there are no stored policy solutions to the broken transactions. The similarity may be set to a pre-stored percentage similarity, such as, for example, 60% similar, 70% similar, 80% similar, 90% similar, or any other suitable percentage.

If the gateway cache does not identify a second broken transaction currently being processed with the pre-stored percentage similarity, the first bionic element may proceed to process the first broken transaction as detailed herein. If the gateway cache does identify a second broken transaction currently being processed by a second bionic element, the second broken transaction having the pre-stored similarity, the first bionic element may put on hold the processing of the first broken transaction and begin to process a third broken transaction received from the network access point. Upon receipt of a message from the gateway cache that the second broken transaction has been fixed, the first bionic element may proceed to pull from the policy bank the policy used by the second bionic element to fix the second transaction. If the API that generated the first broken transaction accepts that fix, then the processing of the first broken transaction by the first bionic element may have been successfully avoided. If the API that generated the first broken transaction sends back a message that the fix has been rejected, the first bionic element may proceed to process the first broken transaction using the AI methods described herein.

In some embodiments, after the running of the FI and GA, in parallel, the methods may include the bionic element combining the outputs of the FI and GA to create all possible solution sets using the output solutions. Each solution set may include, for each step in the subset, one of the output solutions. The methods may include, the bionic element using an optimization algorithm, selecting from the solution sets the most optimal solution set, the second-most optimal solution set, and the third-most optimal solution step. The methods may further include the bionic element transmitting to a policy application pipeline the most optimal solution set, the second-most optimal solution set, and the third-most optimal solution set. In some embodiments, four solutions sets, five solution sets, or more may be transmitted to the policy application pipeline.

The methods may also include the policy application pipeline implementing the most optimal solution set to the broken transaction to convert the broken transaction to a first fixed transaction and transmit the first fixed transaction to the network access point. If the first fixed transaction is rejected by the API, the methods may include the network access point transmitting a command to policy application pipeline to fix the broken transaction.

The methods may include the policy application pipeline for implementing the second-most optimal solution set to the broken transaction to convert the broken transaction to a second fixed transaction and transmit the second fixed transaction to the network access point. The methods may further include the network access point transmitting the second fixed transaction to the API, in response to the transmission, receiving a response from the API indicating that the second fixed transaction has been accepted, and transmitting an instruction to the policy application pipeline to upload to the policy bank the set of features and the second-most optimal solution set.

If the network access point receives from the API a response indicating that the second fixed transaction has been rejected, the methods may include the network access point transmitting an instruction to the policy application pipeline to fix the broken transaction. The policy application pipeline may immediately implement the third-most optimal solution set to fix the transaction. As such, consecutive optimized solution models may be applied to fix the broken transaction without having to re-run the optimization algorithm.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or programs or by utilizing computer-readable data structures.

FIG. 1 shows illustrative apparatus, system architecture and methods in accordance with the invention. In FIG. 1, user 117, user 119 and user 121 are shown communicating with network access point 113 via internet connection 115. Each user may be an API and perform the associated API functions described herein. A user may be a hedge fund, retail banking a line of business within a bank, a bank, or any other suitable entity. Each of user 117, user 119 and user 121 may use transaction processing services provided by a transaction processing entity. The transaction processing entity may run network access point 113, gateway cache 123, bio-mesh network 104 including bionic elements 102a-h, policy bank 109, data stored 11 and GPU acceleration 103. For example, user 117 may transmit to the transaction processing entity a transaction for processing. The network access point 113 may transmit back to user 117 the transaction once the processing of the transaction has been completed.

Network access point 113 may receive from one or more of user 117, user 119 and user 121, a data packet including a transaction. The data packet may include information indicating that the transaction included in the data packet has been rejected, such as a line of code, a flag, or any other suitable information. A rejected transaction may be referred to alternately herein as a 'broken transaction.' Network access point 113 may proceed to route the broken transaction for remediation to bio-mesh network 104 for remediation as described herein. Gateway cache 123 may store data relating to all details of the communications between network access point 113 and bio-mesh network 104. This may provide network access point 113 with stored knowledge relating to which transaction was routed to which bionic element.

A fixed transaction may be received by network access point 113 from a bionic element. Network access point 113 may then route the fixed transaction to the one of users 117, 119 and 121, from which the transaction was originally received.

If the user receiving the transaction determines that the fixed transaction is not properly fixed as per one or more rules stored in a database of the user, the user may route a first binary response to network access point 113. The first binary response may be 'rejected', or any other suitable response indicating that the fixed transaction is unacceptable to the user. Network access point 113 may then check with gateway cache 123 to determine which bionic element was responsible for fixing the transaction most recently received from the user. Upon identification of a bionic element, network access point 113 may then route the transaction to the identified bionic element to execute an additional attempt fix the transaction, as described herein.

If the user receiving the transaction determines that the fixed transaction is acceptable, the user may transmit a second binary response to network access point 113 indicating that the transaction was fixed. The second binary response may be 'accepted' or any other suitable response indicating that the fixed transaction is acceptable to the user. Upon receipt of the second binary response, network access point may check gateway cache 123 to determine which bionic element was response for fixing the transaction most recently received from the user and, after identification, route an instruction to the bionic element to upload to policy bank 109 details regarding the broken transaction that the bionic element fixed, together with the remedial action taken by the bionic element to fix the transaction.

Bio-mesh network 104 may be in electronic communication with policy bank 109 and data store 111. Policy bank 109 may store historical records of broken transactions and, for each stored broken transaction, one or more remedial steps taken to fix the broken transaction. Policy bank 109 may also store one or more user-specific rules that must be applied when fixing a broken transaction originating from one of the users.

Data store 111 may store historical records of broken transactions and, for each stored broken transaction, a policy including one or more remedial steps taken to fix the broken transaction. This may provide redundancy for the data stored in policy bank 109. Data store may additionally store each transaction log's references, either as a copy of the data itself or only the log reference, and the transaction's features. Data stored on the data store may be encrypted and/or anonymized based on requirement protocols. For example, in some embodiments, each bionic element may transmit to data store 111 features of a broken transaction being processed immediately upon receipt. When a bionic element receives a second binary response from network access point 113 indicating that a broken transaction has been fixed, the bionic element may transmit an instruction to data store 111 to purge data relating to the now-fixed transaction.

Bio-mesh network 104 may run on GPU acceleration 103, which may include hardware 105 and software 107. GPU acceleration 103 may include one or more features of apparatus illustrated in FIGS. 4 and 5.

Figure 2:
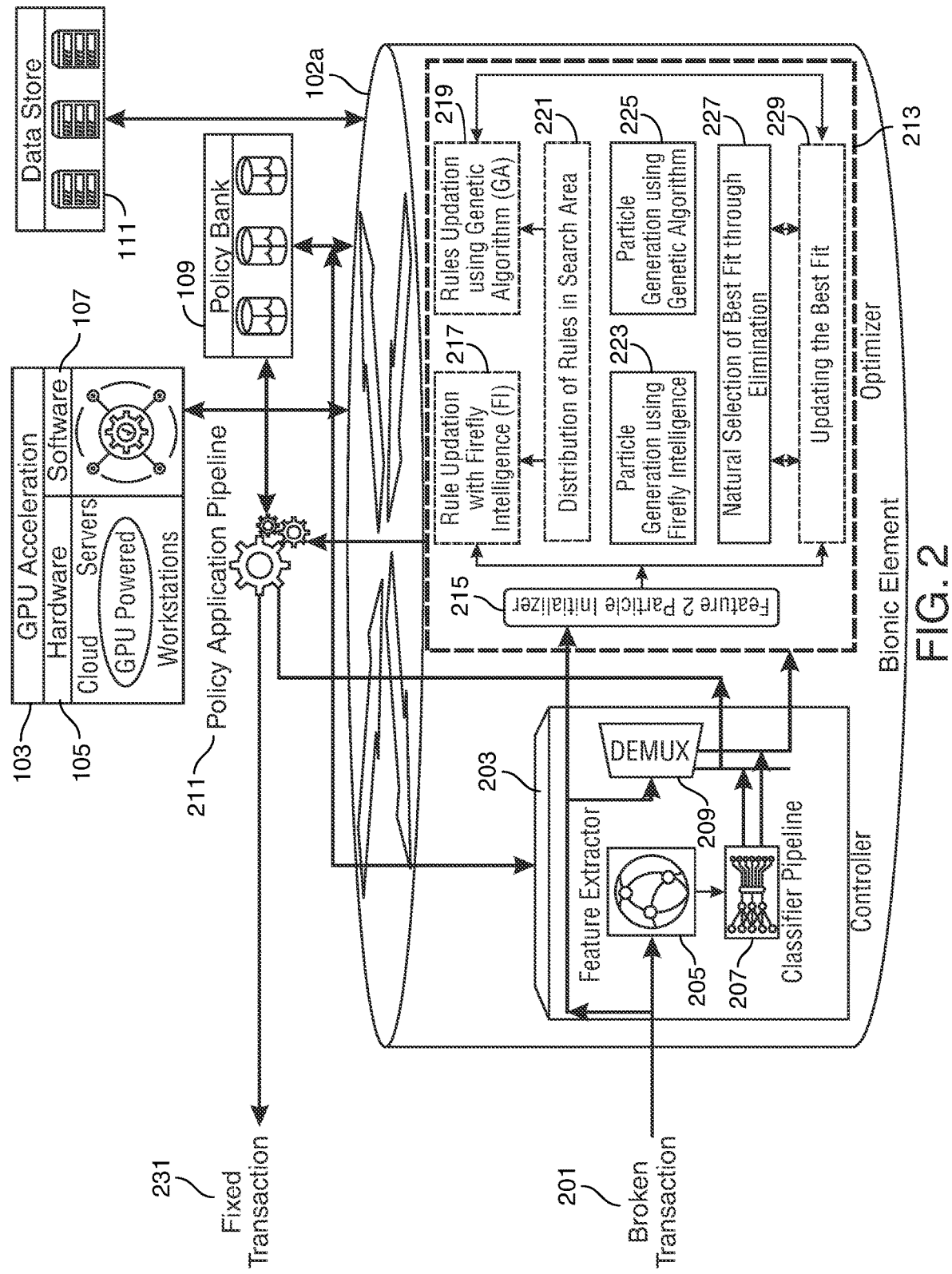
FIG. 2 shows an illustrative apparatus and methods in accordance with the invention.

FIG. 2 shows broken transaction 201 being fed to bionic element 102a and being output from bionic element 102a as fixed transaction 231. Broken transaction 201 may be routed to bionic element 102a from network access point 113.

Bionic element 102a may include controller 203 and optimizer 213. Bionic element 102a may be powered by GPU acceleration 103, as discussed in FIG. 1.

Broken transaction 201 may be received by controller 203. In controller 203, broken transaction 201 may be initially fed to feature extractor 205. Feature extractor 205 may extract features of broken transaction 201. The extracted features may be the set of features. Feature extractor 205 may transmit the extracted features to data store 111, to update the cache in data store 111 relating to the current transactions being processed by the bionic elements included in bio-mesh network 104.

Feature extractor 205 may transmit the features to classifier pipeline 207. Classifier pipeline 207 may communicate with policy bank 109 via demux 209 and policy application pipeline 211 to determine if the features of broken transaction 201 are stored in policy bank 109. If the features are present, classifier pipeline 207 may then determine if policy bank 109 has stored policies for how to remediate the features. If it does, bionic element 102a may extract the policies, instruct policy application pipeline 211 to implement them, and then output fixed transaction 231 to network access point 113.

If the features are not present in policy bank 109, or if the features are present but there is no associated policy for how to fix the features, classifier pipeline and/or feature extractor 205 may transmit the features to optimizer 213. Feature 2 particle initializer 215 may receive the features. Feature 2 particle initializer may further break down the broken transaction into smaller sub-features as discussed herein.

The smaller sub-features may be fed in parallel to two machine learning algorithms, such as Firefly Intelligence and Genetic Algorithm. Specifically, the smaller sub-features may be fed in parallel to particle generation using firefly intelligence 223 and particle generation using genetic algorithm 225 to output 'particles'—i.e. solution sets for the broken transaction. An optimization algorithm, such as natural selection of best fit through elimination 227, may then be used to take the solutions output by each of the genetic algorithms and select which of solution set is optimal, as discussed herein.

The optimal solution set may be transmitted to policy application pipeline 211. Policy application pipeline may apply the optimal solution set to broken transaction 201 to generate fixed transaction 231. Fixed transaction 231 may then be transmitted back to the user for which the transaction was originally generated. If the user transmits a second binary response to network access point 113 indicating that fixed transaction 231 failed to meet one or more of the user's internal requirements for an acceptable transaction, bionic element 102a may receive a message from network access point 113 to execute a second fix to the transaction. Bionic element 102a may then update its optimization rules and then update the best fit 229. Based on the updated optimization rules, a new set of solutions may be identified as a new optimized solution set. The new set of solutions may be transmitted to policy application pipeline 211, which may apply the new set of solutions to broken transaction 201 and transmit the updated transaction back to the user for validation.

Firefly intelligence 217 and genetic algorithm 219 may generate multiple solutions to solve each step of the broken transaction. Firefly intelligence 217 and genetic algorithm 219 may also update their optimization algorithm for a new solution generation when the network access points receives feedback from a user that a previous fix applied was rejected. Upon the generation of a solution policy, distribution of rules in search area 221 may use the positional velocities of each proposed solution (obtained from 217 and 219) in the ranges that are randomly initialized. Updating the best fit 229 may hold the best 'n' numbers of optimal solutions. This data may be transmitted to firefly intelligence 217 and, in some embodiments, genetic algorithm 219 for updating the strategy. This may act as a learning parameter if a proposed policy solution is rejected.

Figure 3:
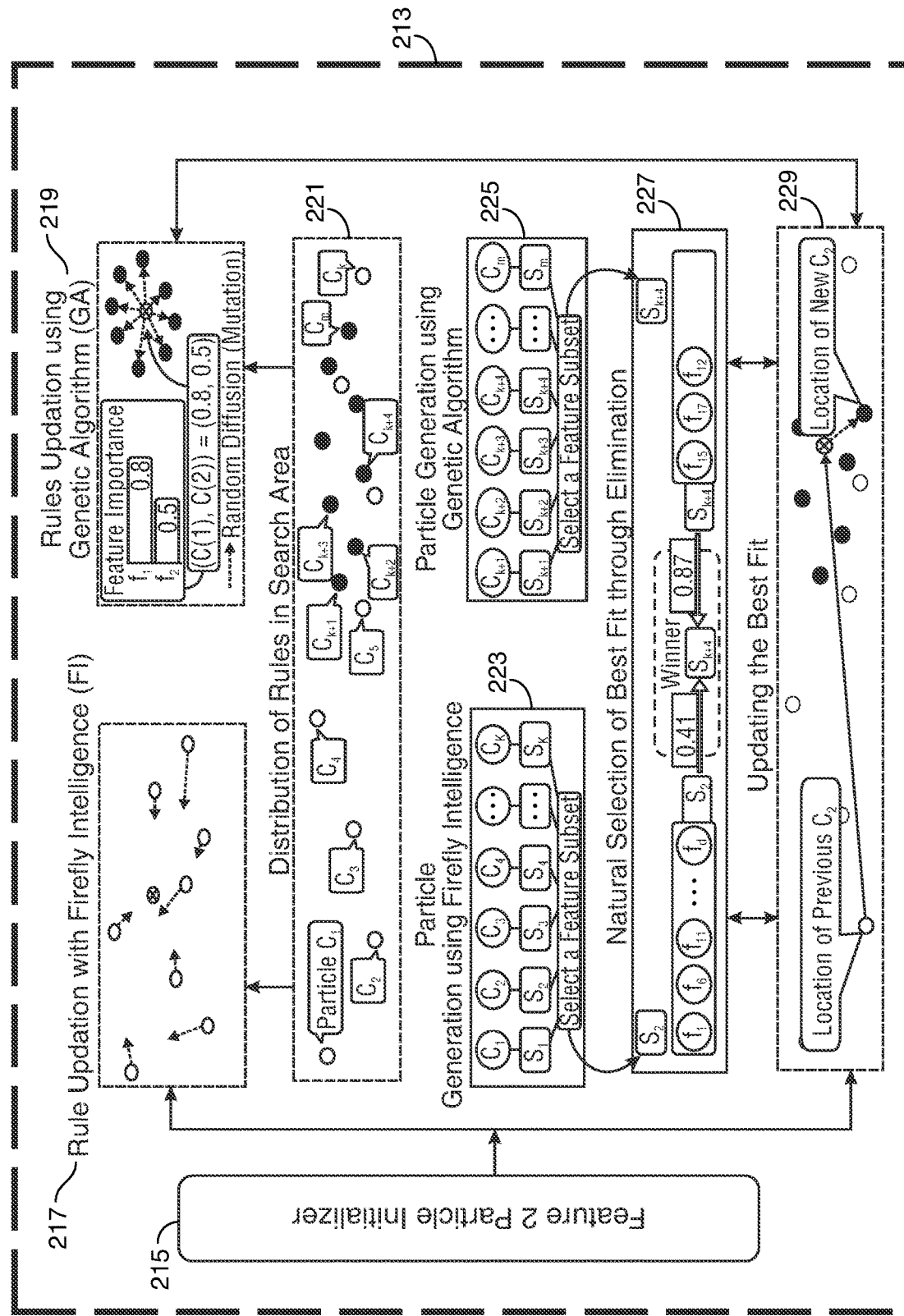
FIG. 3 shows an illustrative apparatus and methods in accordance with the invention.

FIG. 3 shows optimizer 213 together with exemplary illustrations illustrating rule updating with firefly intelligence 217, rules updating using genetic algorithm 210, distribution of rules in search area 221, particle generation using firefly intelligence 223, particle generation using genetic algorithm 225, natural selection of best fit through elimination 227, and updating the best fit 229. It is to be understood that the illustrations in FIG. 3 are for illustrative purposes only, and do not limit the decisioning processes in any way.

Figure 4:
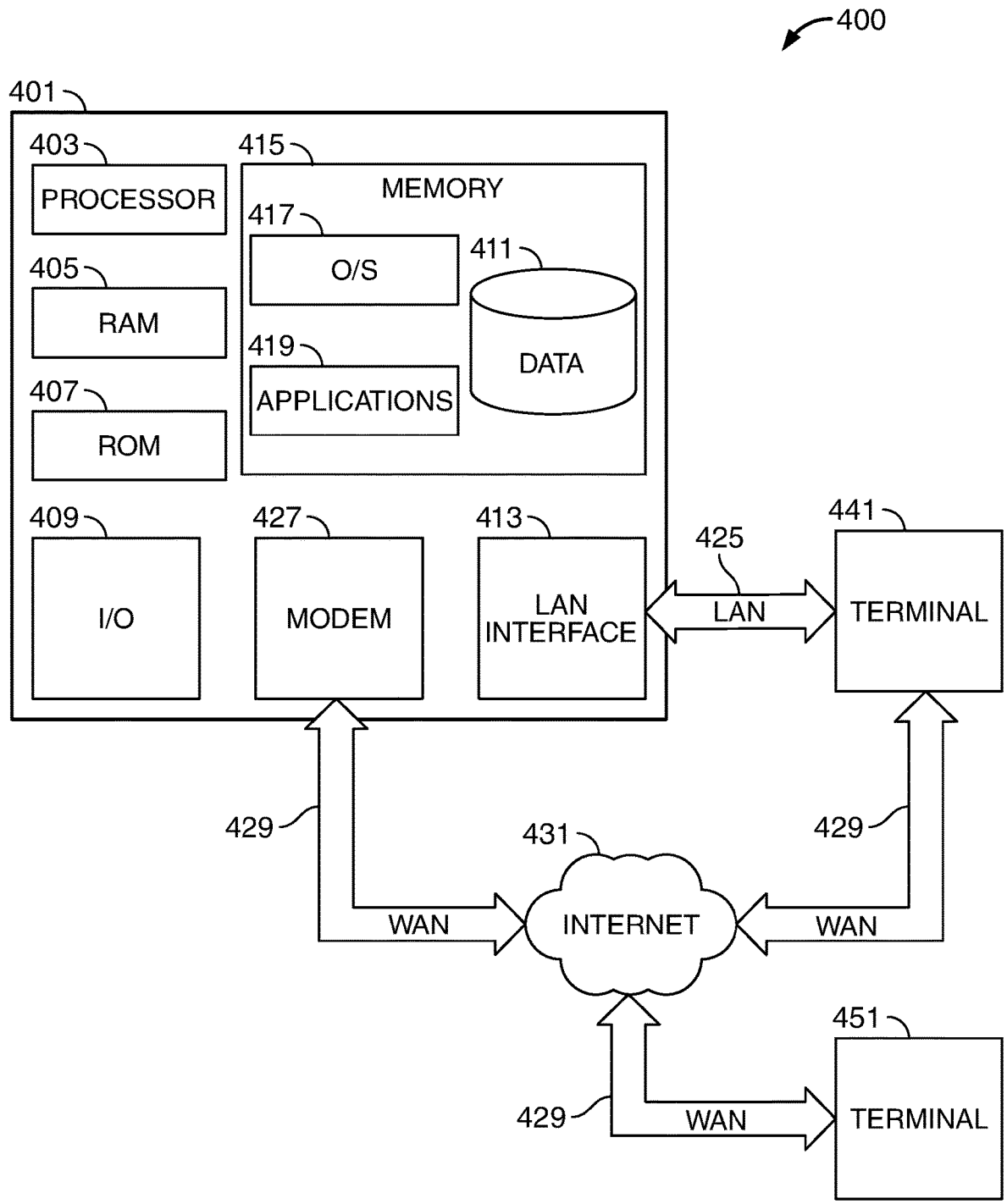
FIG. 4 shows illustrative block diagram of apparatus in accordance with the invention.

FIG. 4 shows an illustrative block diagram of system 400 that includes computer 401. Computer 401 may alternatively be referred to herein as an "engine," "server" or a "computing device." Computer 401 may be a workstation, desktop, laptop, tablet, smart phone, or any other suitable computing device. Elements of system 400, including computer 401, may be used to implement various aspects of the systems and methods disclosed herein. Each of the apparatus illustrated in FIGS. 1, 2 and 3, including users 117, 119 and 121, network access point 113, gateway cache 123, policy bank 109, data store 111, bio-mesh network 104 and GPU acceleration 103, may include some or all of the elements and apparatus of system 400.

Computer 401 may have a processor 403 for controlling the operation of the device and its associated components, and may include RAM 405, ROM 407, input/output circuit 409, and a non-transitory or non-volatile memory 415. Machine-readable memory may be configured to store information in machine-readable data structures. The processor 403 may also execute all software running on the computer—e.g., the operating system and/or voice recognition software. Other components commonly used for computers, such as EEPROM or Flash memory or any other suitable components, may also be part of the computer 401.

The memory 415 may be comprised of any suitable permanent storage technology—e.g., a hard drive. The memory 415 may store software including the operating system 417 and application(s) 419 along with any data 411 needed for the operation of computer 401. Memory 415 may also store videos, text, and/or audio assistance files. The data stored in Memory 415 may also be stored in cache memory, or any other suitable memory.

Input/output ("I/O") module 409 may include connectivity to a microphone, keyboard, touch screen, mouse, and/or stylus through which input may be provided into computer

401. The input may include input relating to cursor movement. The input/output module may also include one or more speakers for providing audio output and a video display device for providing textual, audio, audiovisual, and/or graphical output. The input and output may be related to computer application functionality.

Computer 401 may be connected to other systems via a local area network (LAN) interface 413. Computer 401 may operate in a networked environment supporting connections to one or more remote computers, such as terminals 441 and 451. Terminals 441 and 451 may be personal computers or servers that include many or all of the elements described above relative to computer 401. The network connections depicted in FIG. 4 include a local area network (LAN) 425 and a wide area network (WAN) 429, but may also include other networks. When used in a LAN networking environment, computer 401 is connected to LAN 425 through a LAN interface 413 or an adapter. When used in a WAN networking environment, computer 401 may include a modem 427 or other means for establishing communications over WAN 429, such as Internet 431. Connections between Computer 401 and Terminals 451 and/or 441 may be used for connections between network access point and users 117, 119 and 121, and, in some embodiments, between network access point 113 and bio-mesh network 104.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 419, which may be used by computer 401, may include computer executable instructions for invoking functionality related to communication, such as e-mail, Short Message Service (SMS), and voice input and speech recognition applications. Application program(s) 419 (which may be alternatively referred to herein as "plugins," "applications," or "apps") may include computer executable instructions for invoking functionality related to performing various tasks. Application programs 419 may utilize one or more algorithms that process received executable instructions, perform power management routines or other suitable tasks. Application programs 419 may utilize one or more decisioning processes used by one or both of the machine learning algorithms as detailed herein.

Application program(s) 419 may include computer executable instructions (alternatively referred to as "programs"). The computer executable instructions may be embodied in hardware or firmware (not shown). The computer 401 may execute the instructions embodied by the application program(s) 419 to perform various functions.

Application program(s) 419 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 411, and any other suitable information, may be stored in memory 415. One or more of applications 419 may include one or more algorithms that may be used to implement features of the disclosure comprising the processing and routing of data packets transmitted to local user zone 101 from applications outside local user zone 101.

The invention may be described in the context of computer-executable instructions, such as applications 419, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 401 and/or terminals 441 and 451 may also include various other components, such as a battery, speaker, and/or antennas (not shown). Components of computer system 401 may be linked by a system bus, wirelessly or by other suitable interconnections. Components of computer system 401 may be present on one or more circuit boards. In some embodiments, the components may be integrated into a single chip. The chip may be silicon-based.

Terminal 451 and/or terminal 441 may be portable devices such as a laptop, cell phone, Blackberry™, tablet, smartphone, or any other computing system for receiving, storing, transmitting and/or displaying relevant information. Terminal 451 and/or terminal 441 may be one or more user devices. Terminals 451 and 441 may be identical to computer 401 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multi-processor systems, microprocessor-based systems, cloud-based systems, programmable consumer electronics, network PCs, minicomputers, mainframe computers, distributed computing environments that include any of the above systems or devices, and the like.

Figure 5:
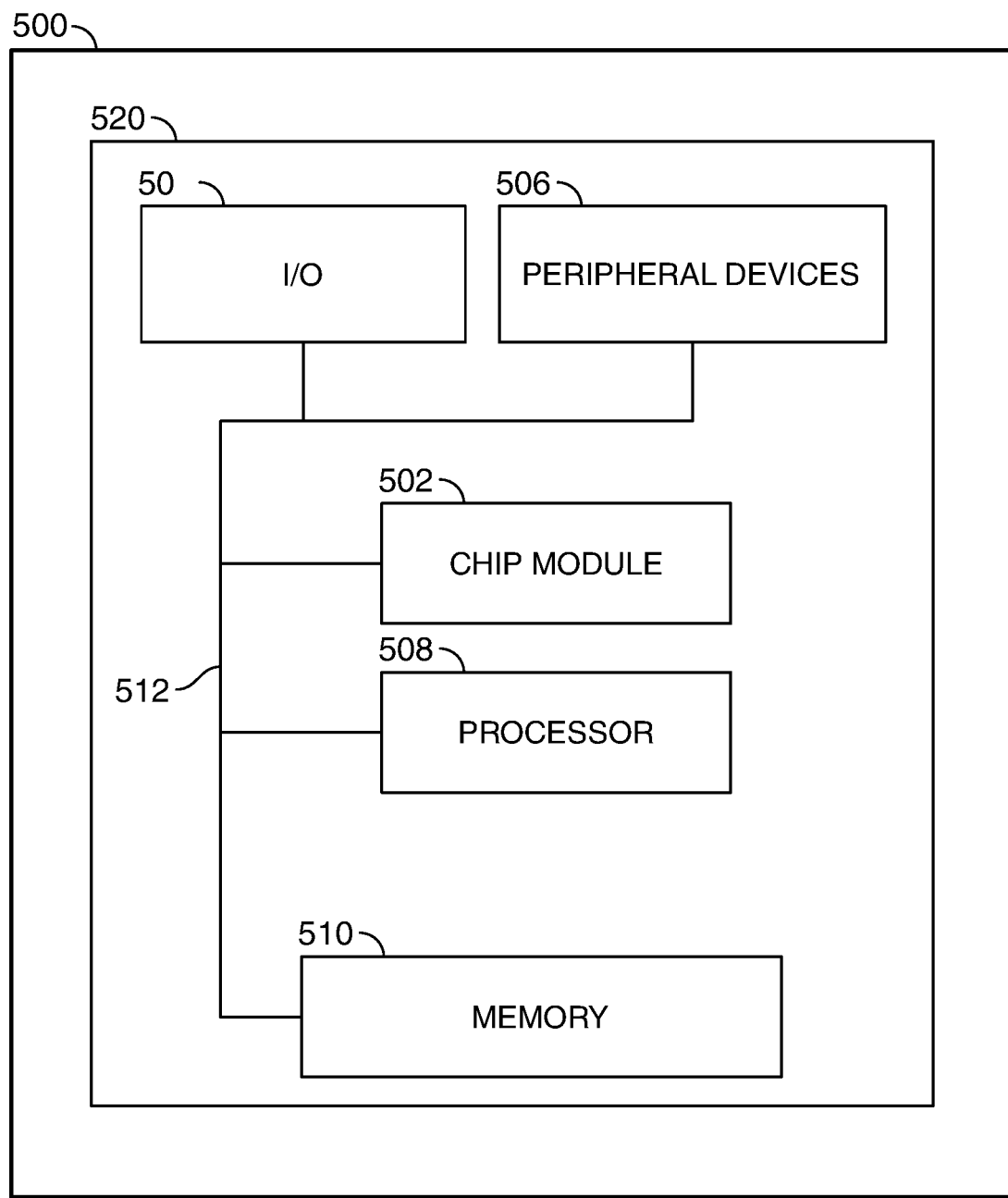
FIG. 5 shows illustrative apparatus that may be configured in accordance with the invention.

FIG. 5 shows illustrative apparatus 500 that may be configured in accordance with the principles of the disclosure. Apparatus 500 may be a computing device. Apparatus 500 may include one or more features of the apparatus shown in FIG. 4. Apparatus 500 may include chip module 502, which may include one or more integrated circuits, and which may include logic configured to perform any other suitable logical operations.

Apparatus 500 may include one or more of the following components: I/O circuitry 504, which may include a transmitter device and a receiver device and may interface with fiber optic cable, coaxial cable, telephone lines, wireless devices, PHY layer hardware, a keypad/display control device or any other suitable media or devices; peripheral devices 506, which may include counter timers, real-time timers, power-on reset generators or any other suitable peripheral devices; logical processing device 508, which may compute data structural information and structural parameters of the data; and machine-readable memory 510.

Machine-readable memory 510 may be configured to store in machine-readable data structures: machine executable instructions, (which may be alternatively referred to herein as "computer instructions" or "computer code"), applications such as applications 419, signals, and/or any other suitable information or data structures.

Components 502, 504, 506, 508 and 510 may be coupled together by a system bus or other interconnections 512 and may be present on one or more circuit boards such as circuit board 520. In some embodiments, the components may be integrated into a single chip. The chip may be silicon-based.

Thus, systems and methods for the intelligent auto-healing of broken transactions are provided. Persons skilled in the art will appreciate that the present invention can be practiced by other than the described embodiments, which are presented for purposes of illustration rather than of limitation.

What is claimed is:

1. A method for accelerating the remediation of broken transactions using parallel machine learning processing and optimization, the method comprising:
    a network access point receiving, from an application programming interface ("API"), a broken transaction;
    the network access point for selecting a bionic element within a bio-mesh network for processing the broken transaction and routing the broken transaction to the bionic element;
    the bionic element for:
        receiving the broken transaction and extracting, from the broken transaction, a set of features;
        transmitting the set of features to a policy bank;
        in response to the policy bank failing to identify a stored routine associated with the set of features for fixing the broken transaction:
            identifying, from a header of the broken transaction, each instance of the transaction being processed by a processing entity;
            assigning to each instance, in chronological order, a step number, to represent the transaction as a sum of $n_x$ steps from x=0 to x=n;
            for each step, comparing information stored in the header associated with the step to compliance protocols;
            identifying a subset of the steps that fail to satisfy one or more of the compliance protocols;
            feed the sequence of steps, the subset of the steps, and, for each step in the subset, information detailing the one or more failures to meet the compliance protocols, to both a firefly algorithm ("FI") and a genetic algorithm ("GA");
            run the FI and GA, in parallel, and receive from the FI and GA outputs including, for each step in the subset, one or more solutions;
            using an optimization algorithm set to optimize speed only, selecting from the outputs of the FI and GA, for each step, a first optimized solution;
            combining each first optimized solution to create a first policy;
            transmit the first policy to a policy application pipeline;
    the policy application pipeline for implementing the first policy to the broken transaction to convert the broken transaction to a first fixed transaction and transmit the first fixed transaction to the network access point;
    the network access point for:
        transmitting the first fixed transaction to the API;
        in response to the transmission, receiving a response from the API indicating that the first fixed transaction has been rejected;
        transmitting a command to the bionic element to output a second policy to fix the broken transaction;
    the bionic element for:
        adjusting the optimization algorithm to optimize both speed and accuracy;
        using the adjusted optimization algorithm, selecting from the outputs of the FI and GA, for each step, a second optimized solution;
        combining each second optimized solution to create a second policy; and
        transmitting the second policy to the policy application pipeline; and
    the policy application pipeline for implementing the second policy to the broken transaction to convert the broken transaction to a second fixed transaction and transmit the second fixed transaction to the network access point.

2. The method of claim 1 further comprising the network access point performing the method steps of:
    transmitting the second fixed transaction to the API; and
    in response to the transmission, receiving a response from the API indicating that the second fixed transaction has been accepted.

3. The method of claim 2 further comprising the network access point, in response to the receipt of the response from the API indicating that the second fixed transaction has been accepted, transmitting an instruction to the bionic element to upload to the policy bank the set of features and the second policy.

4. The method of claim 3 further comprising the bionic element uploading to the policy bank the set of features and the second policy.

5. The method of claim 1 wherein the set of features includes an account time stamp, a transaction type, a transaction amount, a transaction time stamp, an origin account and a destination account.

6. The method of claim 1 wherein the compliance protocols include a match between a debit entry and a corresponding credit entry, an incorrect value date, and the requirement of each step being associated with a key generated during the step by the processing entity.

7. The method of claim 1 wherein the network access point, prior to transmitting the first fixed transaction to the API, searches a log file stored in a gateway cache to retrieve a communication protocol associated with the API.

8. The method of claim 1 wherein:
    the bio-mesh network includes a plurality of bionic elements; and
    the bio-mesh network selects the bionic element from the plurality of bionic elements for the processing of the broken transaction.

9. The method of claim 1, when the bio-mesh network includes a plurality of bionic elements, further comprising a gateway cache that performs the method steps of:

storing a log recording the routing of broken transactions from the network access point to the plurality of bionic elements; and maintaining a prioritization algorithm used by the network access point to determine which bionic element in the plurality of bionic elements should receive an incoming broken transaction.

10. The method of claim 1, when the bionic element is a first bionic element and the broken transaction is a first broken transaction, further comprising the first bionic element performing the method steps of:

searching a gateway cache to determine if a second bionic element included in the bio-mesh network is currently processing a second broken transaction having features similar to features of the first broken transaction, the similarity being set to a pre-stored percentage similarity;

putting on hold the processing of the first broken transaction and beginning to process a third broken transaction received from the network access point when the gateway cache stores data identifying a second broken transaction currently being processed that has a similarity equal to or greater than the pre-stored percentage similarity; and proceeding to execute the identifying of each instance of the first transaction being processed by a processing entity when the gateway cache does not store data identifying a second broken transaction being currently processed with at least the pre-stored percentage similarity;

wherein:

the searching the gateway cache is performed after the policy bank fails to identify a stored routine associated with the set of features and prior to the first bionic element executing the identifying of each instance of the transaction being processed by a processing entity.

\* \* \* \* \*